United States Patent [19]

Werner

[11] Patent Number: 4,780,001

[45] Date of Patent: Oct. 25, 1988

[54] BEARING ASSEMBLY

[75] Inventor: Willy Werner, Detroit, Mich.

[73] Assignee: Werner Tool and Manufacturing Co., Detroit, Mich.

[21] Appl. No.: 12,442

[22] Filed: Feb. 9, 1987

[51] Int. Cl.$^4$ .......................... F16C 17/02; F16C 19/49
[52] U.S. Cl. ..................................... 384/206; 384/563
[58] Field of Search ............... 384/494, 585, 563, 517, 384/474, 906, 206, 213

[56] References Cited

U.S. PATENT DOCUMENTS

| | | | |
|---|---|---|---|
| 2,272,118 | 2/1942 | Imse et al. | 384/206 |
| 2,556,368 | 6/1951 | Hegeman | 384/517 |
| 2,736,617 | 2/1956 | Lippmann | 384/563 |
| 3,156,506 | 11/1964 | Scheifele et al. | |
| 3,273,271 | 9/1966 | Werner | |
| 3,383,785 | 5/1968 | Werner | |
| 3,387,394 | 6/1968 | Werner | |
| 3,580,648 | 5/1971 | Zink | |
| 3,726,576 | 4/1973 | Barnbrook et al. | 384/563 |
| 3,905,661 | 9/1975 | Orr | |
| 3,945,777 | 5/1976 | Labus | |
| 4,030,786 | 6/1977 | Schluter et al. | |
| 4,085,984 | 4/1978 | Cameron | |
| 4,172,621 | 10/1979 | Yoshida | |
| 4,175,802 | 11/1979 | Voll et al. | |
| 4,223,570 | 9/1980 | Yamamori et al. | |
| 4,273,391 | 6/1981 | Asberg | |
| 4,303,257 | 12/1981 | Perotti et al. | |
| 4,319,789 | 3/1982 | Irwin | |
| 4,333,695 | 6/1982 | Evans | |

Primary Examiner—Lenard A. Footland
Attorney, Agent, or Firm—Gifford, Groh, VanOphem, Sheridan, Sprinkle and Dolgorukov

[57] ABSTRACT

The present invention provides a bearing assembly for use in a display assembly having a plurality of louvers which rotate in synchronism with each other and, in doing, displays different advertising messages. The bearing assembly includes a housing having an axis and a shaft extending axially through the housing. A pair of axially spaced bearings rotatably mount the shaft to the housing. A pair of collars are secured to the shaft so that the bearings are contained in between the collars while a Belleville washer is sandwiched between one collar and one bearing and exerts a compressive force on the bearings and a tension force on the shaft in order to compensate for bearing wear and manufacturing tolerances. A novel construction for mounting the louvers in their frame is also disclosed.

8 Claims, 2 Drawing Sheets

BEARING ASSEMBLY

BACKGROUND OF THE INVENTION

I. Field of the Invention

The present invention relates generally to bearing assemblies and, more particularly, to a dual bearing assembly with means for automatically compensating for bearing wear.

II. Description of the Prior Art

One previously known advertising display such as disclosed in U.S. Pat. No. 3,387,394 comprises a plurality of triangular louvers which are rotatably mounted in a frame and rotatably driven in unison with each other. Thus, different advertising messages are displayed as the louvers are rotatably driven to different rotational positions. These displays are driven by electric motors and a bearing assembly is typically interposed between the electric motor and each louver. The opposite end of each louver is connected by a shaft to the frame.

A primary disadvantage of these previously known display assemblies is that the components of the display assembly, and particularly the bearing assembly, are subjected to excessive wear due to their prolonged and continuous operation and as such, have previously required frequent maintenance and part replacement. Furthermore, when the gearing assemblies for these previously known display assemblies begin to wear, shaft wobble results which not only hastens the deterioration of the bearing assembly but also imposes undesirable loads and stresses on the electric motor. These loads not only damage the electric motor buy may also necessitate its replacement.

A still further disadvantage of these previously known displays is that the shaft which connects the end of the louver opposite from the bearing assembly is typically fastened to the frame by a nut. After prolonged use, the nut frequently becomes loose which causes the display to malfunction.

SUMMARY OF THE PRESENT INVENTION

The present invention provides a bearing assembly particularly suited for a display assembly which overcomes all of the above mentioned disadvantages of the previously known devices.

In brief, the bearing assembly of the present invention comprises a tubular housing having an elongated shaft extending coaxially through it. A pair of axially spaced bearings are contained within the housing and rotatably mount a drive shaft to the housing. Preferably, each bearing is a tapered roller bearing.

A pair of collars are secured to the shaft at axially spaced positions so that the bearings are contained in between the collars and so that one collar abuts against one bearing. A belleville washer is sandwiched between the other collar and the other bearing assembly which imposes a compressive force between the bearing assemblies and, simultaneously, a tension force on the shaft.

In operation, the Belleville washer preloads the bearings to automatically compensate for bearing wear as well as manufacturing tolerances. In doing so, the bearing assembly automatically eliminates the wobbling of the bearing assembly and is capable of prolonged operation without malfunction.

In addition, in the preferred embodiment of the invention, the louver shaft opposite from the bearing assembly is fixedly secured to the frame and has a pointed end which faces the louver. This pointed end is received within a bushing on the louver.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figures 1, 2:
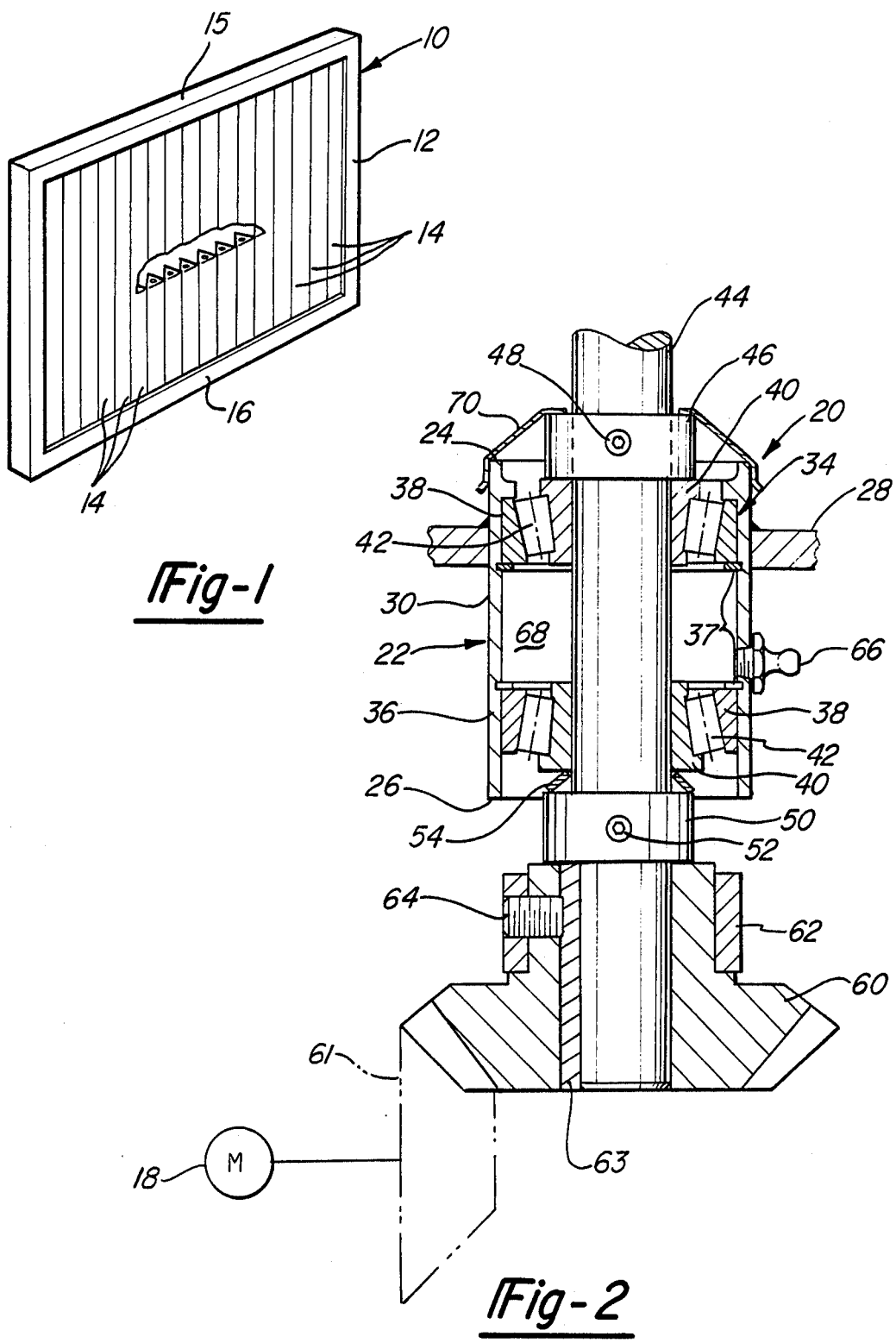
FIG. 1 is a fragmentary perspective view illustrating a preferred embodiment of the invention as used with a display assembly.
FIG. 2 is a longitudinal sectional view of the preferred embodiment of the bearing assembly of the present invention.

With reference to FIG. 1, a display assembly 10 is thereshown having a rectangular frame 12 which supports a plurality of triangular louvers 14 between its top 15 and bottom 16. A louver shaft 44 (FIG. 2) mounts each louver 14 to the bottom 16 of the frame 12 while an upper shaft 100 (FIG. 4) mounts each louver 14 to the top 15 of the frame 12. An electric motor 18 (FIG. 2) rotatably drives the shafts 44 and their attached louvers 14 through bearing assemblies 20.

With reference now to FIG. 2, one bearing assembly 20 is thereshown in greater detail and comprises a tubular and cylindrical housing 22 open at both its top end 24 and its bottom end 26. A mounting flange 28 is secured to the outer periphery 30 of the housing 22 for mounting the housing 22 to the base 12 (FIG. 1). Any conventional means, such as bolts (not shown), can be used to secure the mounting flange 28 to the bottom 16 of the frame 12.

Still referring to FIG. 2, a pair of bearings 34 and 36 are contained within the interior of the housing 22 and are axially spaced from each other. Each bearing 34 and 36 includes an outer race 38, an inner race 40 and a plurality of bearing elements 42 rotatably entrapped therebetween. Preferably, the bearing elements 42 are tapered roller bearings so that the axes of the bearing elements 42 on the bearings 34 and 36 angle toward the center of the housing 22 and intersect each other obliquely. In addition, a pair of axially spaced retainer clips 37 are secured to the interior of the housing 22. These clips 37 abut against the outer races 38 of the bearings 34 and 36 and maintain the bearings 34 and 36 spaced apart from each other.

The shaft 44 extends axially through the inner races 40 of the bearings 34 and 36 and thus axially through the housing 22. A first collar 46 is secured by a pin 48 to the shaft 44 so that the collar 46 abuts against the inner race 40 of the bearing assembly 34. Similarly, a second collar 50 is secured by a pin 52 to the shaft 44 so that the collars 46 and 50 are axially spaced from each other and so that the bearings 34 and 36 are positioned in between the collars 46 and 50.

A resilient member 54, such as a Belleville washer, is sandwiched in between the collar 50 and the inner race 40 of the bearing 36 so that the resilient member 54 is in a state of compression. The spring member 54 thus compressively urges the inner races 40 of the bearings 34 and 36 together and against their retaining clips 37. Simultaneously, the spring member 54 exerts a tension force on the shaft 44 equal in magnitude to the compressive force exerted on the bearings 34 and 36.

Still referring to FIG. 2, a bevel gear 60 is detachably secured to one end of the shaft 44 by a collar 62 and set screw 64 which abuts against a notch in a key 63. This bevel gear 60 meshes with a bevel gear 61 from the motor 18 to rotatably drive the shaft 44.

Preferably, a grease fitting 66 is mounted to the housing 22 so that its inner end is open to a tubular cylindrical chamber 68 formed between the housing 22, shaft 44 and bearings 34 and 36. The fitting 66 allows grease or other lubricant to be introduced into the chamber 68 in order to lubricate the bearings 34 and 36. A dust cover 70 also preferably closes the end 24 of the housing 22 in order to minimize the introduction of contaminants into the bearing assembly 20.

In operation, the resilient member 54 resiliently urges the bearings 34 and 36 together. As the bearing members 42 and/or the bearing races 38 and 40 begin to wear, the resilient member 54 expands to maintain the bearing members 42 in a state of compression between the races 38 and 40 due to the inclined axes of the bearing members 42 with respect to the axis of the shaft 44. Consequently, the resilient member 54 automatically compensates for any bearing wear thereby eliminating shaft wobble. The spring member 54 also compensates for manufacturing tolerances in the attachment between the collars 46 and 50 to the shaft 44.

Although in the preferred form of the invention, the bearings are resiliently compressed toward each other while the shaft is in a state of tension, alternatively the bearings can be placed in a state of tension and the shaft in a state of compression to eliminate any play in the bearings.

Figure 3:
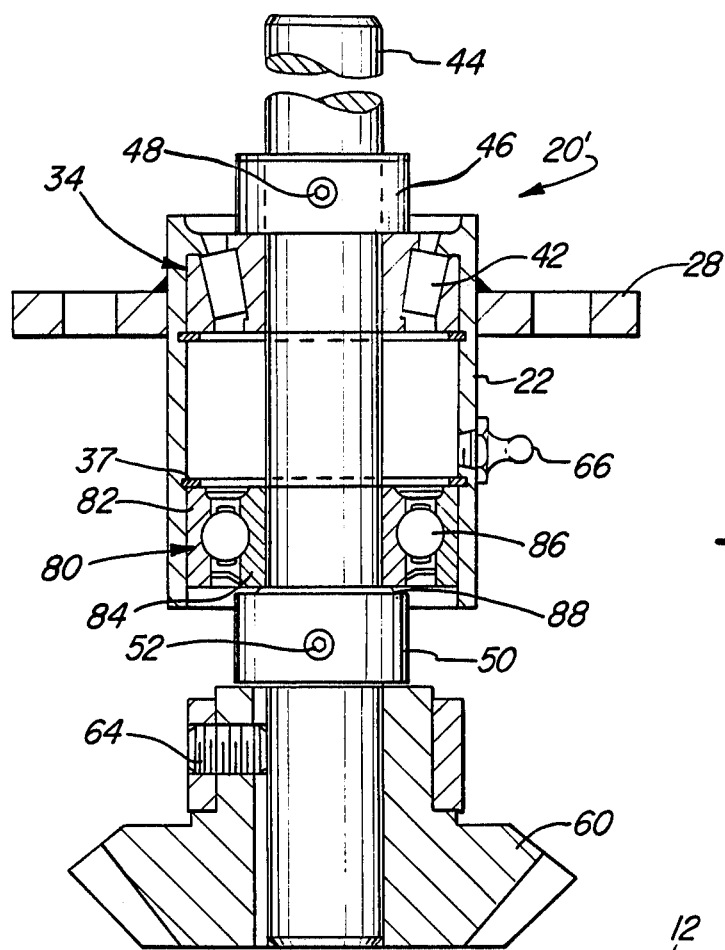
FIG. 3 is a view similar to FIG. 2 but showing a modification thereof.

With reference now to FIG. 3, a modification of the bearing assembly 20 of the present invention is thereshown in which a ball bearing assembly 80 replaces the louver roller bearing assembly 36 of the FIG. 2 embodiment. The ball bearing assembly 80 includes an outer race 82, inner race 84 and ball bearing elements 86 between the races 82 and 84. The clip 37 locks the outer race 82 against movement of the housing 22 while the inner race 84 abuts against an enlarged diameter portion 88 on the shaft 44.

The FIG. 3 embodiment further differs from the FIG. 2 embodiment in that the collars 50 and 46 are secured to the shaft 44 by the pins 48 and 52 so that the bearing assemblies 34 and 80 are compressed in between the collars 46 and 50. Thus, as the bearing assemblies wear after prolonged use, any play in the bearing is eliminated by the compression exerted on the bearing assemblies by the collars 46 and 50.

Figure 4:
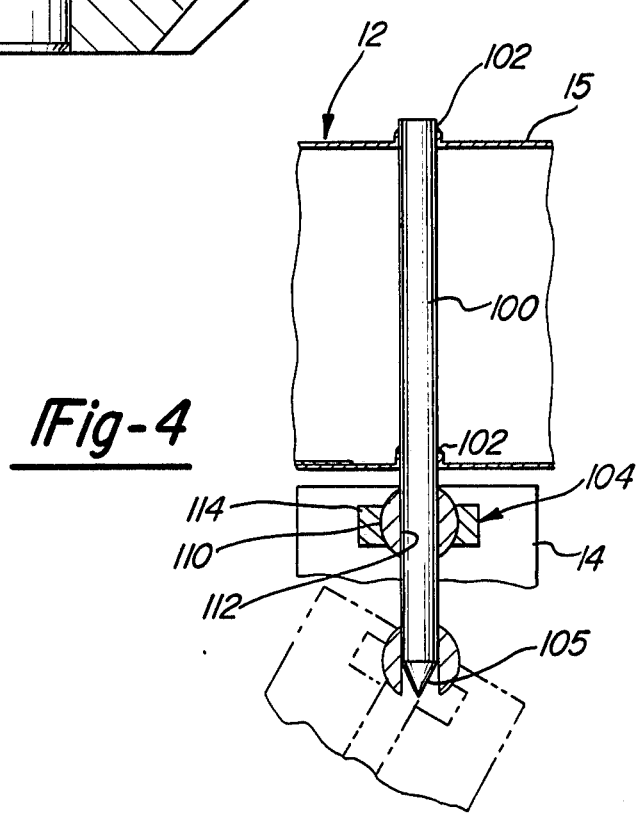
FIG. 4 is a fragmentary sectional view showing a portion of the preferred embodiment of the invention.

With reference now to FIG. 4, a still further feature of the display assembly is thereshown in which the shafts 100 rotatably mount the upper ends of the louvers 14 to the top 15 of the frame 12. Each shaft 100 is fixedly secured to the frame by welds 102 or the like so that the shafts are aligned with the axis of the louvers 14. In addition, each shaft 10 includes a pointed end 105 which points toward the bottom 16 of the frame 12.

Each louver 14 includes a bushing 104 at its upper end which is adapted to receive the shaft 100 therethrough. The bushing 104 includes a ball 110 having a throughbore 112 adapted to receive the shaft 100 therethrough. The ball 110 is rotatably mounted in a sleeve 114 and can pivot from the position shown in phantom line, which facilitates insertion of the shaft end 105, and to the position shown in solid line. In order to mount the louver to its shaft 100, the pointed end of the shaft 10 is first inserted into the ball 110 in the bushing 104 as shown in phantom line and then moved to the position shown in solid line.

From the foregoing, it can be seen that the bearing assembly as well as the shaft assembly of FIG. 4 of the present invention provides an inexpensive bearing assembly particularly suited for advertising displays which are capable of prolonged operation without failure.

Having described my invention, however, many modifications thereto will become apparent to those skilled in the art to which it pertains without deviation from the spirit of the invention as defined by the scope of the appended claims.

I claim:

1. A bearing assembly for a display having at least one louver, said assembly comprising:
    a housing having an axis;
    a shaft extending axially through said housing;
    a pair of collars detachably mounted to said shaft;
    a pair of bearings for rotatably mounting said shaft to said housing, said bearings being axially spaced from each other, said bearings being positioned between said pair of collars, so that one of said pair of collars abuts against one of said pair of bearings;
    means for automatically compensating for bearing wear comprising a spring member compressibly disposed between an other of said pair of collars and an other of said pair of bearings; and
    means for detachably mounting said pair of collars to said shaft so that said shaft may be moved axially for installation and removal of said at least one louver from said display.

2. The invention as defined in claim 1 wherein said compensating means comprises means for resiliently axially compressing one of said bearings or said shaft and for resiliently axially tensioning the other of said bearings or said shaft.

3. The invention as defined in claim 1 wherein each bearing comprises an outer race secured to said housing, an inner race secured to said shaft and a plurality of bearing elements between said races.

4. The invention as defined in claim 3 wherein said bearing elements are tapered roller bearing elements.

5. The invention as defined in claim 4 wherein the axes of the bearing elements on one bearing intersect the axes of the bearing elements on the other bearing at an oblique angle.

6. The invention as defined to claim 1 wherein said spring member comprises a Belleville washer.

7. The invention as defined in claim 1 wherein said housing, said shaft and said bearings together form a substantially closed chamber, and means for introducing a lubricant in said chamber.

8. A rotatable mounting assembly for a display having a frame and at least one louver rotatably mounted to said frame comprising a shaft having a pointed end, means for fixedly securing said shaft to said frame and a bushing secured to said louver, said bushing comprising a ball pivotally mounted in a sleeve, said ball having a throughbore adopted to receive said shaft therethrough, said ball being fully rotatable about both a tranverse and a longitudinal axis of said sleeve.

* * * * *

UNITED STATES PATENT AND TRADEMARK OFFICE
CERTIFICATE OF CORRECTION

PATENT NO. : 4,780,001
DATED : October 25, 1988
INVENTOR(S) : Willy Werner

It is certified that error appears in the above-identified patent and that said Letters Patent is hereby corrected as shown below:

Col. 1, line 32, delete "buy" and insert --but--;

Col. 3, line 62, delete "10" and insert --100--;

Col. 4, line 4, delete "10" and insert --100--.

Signed and Sealed this

Fourteenth Day of March, 1989

Attest:

DONALD J. QUIGG

*Attesting Officer*   *Commissioner of Patents and Trademarks*